United States Patent
Li et al.

(10) Patent No.: US 9,249,268 B2
(45) Date of Patent: Feb. 2, 2016

(54) POLYMERIC BLENDS AND ARTICLES MADE THEREFROM

(71) Applicant: FINA TECHNOLOGY, INC., Houston, TX (US)

(72) Inventors: Fengkui Li, Houston, TX (US); John Ashbaugh, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/304,392

(22) Filed: Jun. 13, 2014

(65) Prior Publication Data

US 2015/0361231 A1 Dec. 17, 2015

(51) Int. Cl.
| | |
|---|---|
| *C08K 3/26* | (2006.01) |
| *C08F 242/00* | (2006.01) |
| *C08J 5/18* | (2006.01) |
| *B29C 55/00* | (2006.01) |
| *B29K 23/00* | (2006.01) |

(52) U.S. Cl.
CPC ............... *C08J 5/18* (2013.01); *B29C 55/005* (2013.01); *B29K 2023/14* (2013.01)

(58) Field of Classification Search
CPC ...... C08J 5/18; B29C 55/005; B29K 2023/14
USPC ........................................................ 524/425
See application file for complete search history.

(56) References Cited

U.S. PATENT DOCUMENTS

| | | | |
|---|---|---|---|
| 2,178,104 | A | 10/1939 | Kline et el. |
| 2,758,987 | A | 8/1956 | Salzberg |
| 4,029,876 | A | 6/1977 | Beatty et al. |
| 5,310,865 | A | 5/1994 | Enomoto et al. |
| 8,268,913 | B2 | 9/2012 | Li et al. |
| 8,586,192 | B2 | 11/2013 | Li et al. |
| 8,642,701 | B2 | 2/2014 | Li et al. |
| 2007/0255013 | A1* | 11/2007 | Becraft et al. ............... 525/418 |
| 2010/0009208 | A1* | 1/2010 | Lee ............................. 428/483 |
| 2011/0132519 | A1* | 6/2011 | Li et al. .......................... 156/60 |

FOREIGN PATENT DOCUMENTS

| | | |
|---|---|---|
| CN | 103788603 A | 5/2014 |
| JP | 2006076576 A * | 3/2006 |

OTHER PUBLICATIONS

Translation of JP 2006-076576, Mar. 2006.*
Rahul M. Rasal et al.,"Poly(lactic acid) modifications", Progress in Polymer Science 35 (2010) 338-356.
Angew. Makromol. Chem, 1995, V229, "Melt free-radical grafting of glycidyl methacrylate onto polypropylene", pp. 1-13.
International Search Report and Written Opinion issued in PCT/US15/35542, dated Aug. 26, 2015, 9 pages.

* cited by examiner

*Primary Examiner* — Hui Chin

(57) ABSTRACT

A biaxially oriented film includes a PLA and polyolefin (PLA/PO) blend. The film has a haze of 80% or greater as measured by ASTM-D1003 and a 45° gloss of less than 50% as measured by ASTM-D-2457.

25 Claims, 1 Drawing Sheet

POLYMERIC BLENDS AND ARTICLES MADE THEREFROM

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable

BACKGROUND

1. Technical Field

This disclosure relates to polymeric compositions including a biodegradable polymer.

2. Background

Articles constructed from certain synthetic polymeric materials have widespread utility, but may remain semipermanently in a natural environment. Certain biodegradable polymers may be used in conjunction with these synthetic polymeric materials to form articles that may degrade more rapidly than articles made solely with synthetic polymeric materials.

SUMMARY

An embodiment of the present disclosure is directed to a biaxially oriented film. The biaxially oriented film includes a polylactic acid and polyolefin (PLA/PO) blend. The film has a haze of 80% or greater as measured by ASTM-D-1003 and a 45° gloss of less than 50% as measured by ASTM-D-2457.

Another embodiment of the present disclosure is directed to a method of producing a biaxially oriented film. The method includes blending polylactic acid and a polyolefin to form a polymeric blend (PLA/PO blend) having a ratio of PLA to PO in the blend between 4:1 and 199:1. The method further includes forming the PLA/PO blend into a film, and biaxially orienting the film to form a film having a haze of 80% or greater as measured by ASTM-D1003 and a 45° gloss of less than 50% as measured by ASTM-D-2457.

Yet another embodiment of the present disclosure is directed to an article. The article includes a polylactic acid and polyolefin (PLA/PO) blend having a ratio of PLA to PO in the blend of between 4:1 and 199:1, wherein the object is opaque.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1A:
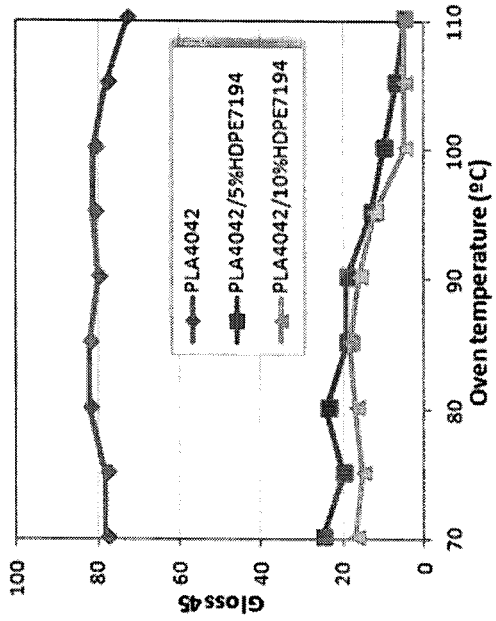
FIG. 1A is graph of oven temperature versus haze as described in the Example.

A detailed description will now be provided. The description includes specific embodiments, versions and examples, but the disclosure is not limited to these embodiments, versions or examples, which are included to enable a person having ordinary skill in the art to make and use the disclosure when that information is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Disclosed herein are polymeric compositions and articles made therefrom. In some embodiments, the polymeric compositions include polylactic acid (PLA).

Polylactic acid suitable for use in this disclosure may be of the type known in the art. For example, polylactic acid may include poly-L-lactide (PLLA), poly-D-lactide (PDLA), poly-LD-lactide (PDLLA), or combinations thereof. Modified polylactic acid is also suitable for use in this disclosure. Modified polylactic acid refers to stereocomplex polylactic acid and surface-modified polylactic acid, as described in Rahul M. Rasal et al., Poly(lactic acid) modifications, PROGRESS IN POLYMER SCIENCE 35 (2010) 338-356, which is incorporated herein fully by reference. Surface-modified polylactic acid includes, but is not limited to, coated polylactic acid, polylactic acid with entrapped biomacromolecules, polylactic acid blended with migratory additives, chemically conjugated polylactic acid, and polylactic acid that has been photografted. Polylactic acid may be prepared using any suitable method known to one or ordinary skill in the art. For example, polylactic acid may be prepared by dehydration condensation of lactic acid, such as described in U.S. Pat. No. 5,310,865, which is incorporated herein by reference in its entirety. Alternatively, polylactic acid may be prepared by synthesis of a cyclic lactide (also known as cyclic dimmer) from lactic acid followed by ring opening polymerization of the cyclic lactide. An example of such a process is described in U.S. Pat. No. 2,758,987, which is incorporated herein by reference in its entirety.

Catalysts may be used in the production of polylactic acid. The catalysts may be of any type suitable for the process. Examples of such catalysts include without limitation tin compounds such as tin octylate, titanium compounds such as tetraisopropyl titanate, zirconium compounds such as zirconium isopropoxide, and antimony compounds such as antimony trioxide.

In an embodiment, a polylactic acid suitable for use in this disclosure may have a density of from 1.238 g/cc to 1.265 g/cc, alternatively from 1.24 g/cc to 1.26 g/cc, and alternatively from 1.245 g/cc to 1.255 g/cc as determined in accordance with ASTM D792; a melt index of from 5 g/10 min. to 35 g/10 min. or alternatively from 15 g/10 min. to 30 g/10 min., as determined in accordance with ASTM D1238 at a temperature of 210° C. and a load of 2.16 kg; a crystalline melt temperature of from 150° C. to 180° C. or alternatively from 155° C. to 170° C.; a glass transition temperature of from 45° C. to 85° C., alternatively from 50° C. to 80° C., or alternatively from 55° C. to 60° C. as determined in accordance with ASTM D3417; a tensile yield strength of from 4,000 psi to 25,000 psi, alternatively from 5,000 psi to 20,000 psi, or alternatively from 8,000 psi to 10,000 psi as determined in accordance with ASTM D638; a tensile elongation of from 1.5% to 10%, alternatively from 2% to 8%, or alternatively of from 3% to 4% as determined in accordance with ASTM D638; a notched Izod impact of from less than 2 ft-lb/in, or between, 0.1 ft-lb/in to 0.8 ft-lb/in or from 0.2 ft-lb/in to 0.7 ft-lb/in, as determined in accordance with ASTM D256. Examples of polylactic acid suitable for use in this disclosure include without limitation PLA3251, PLA4202, and PLA6202, which are commercially available from Nature Works LLC.

The polymeric composition of some embodiments of the present disclosure includes a polyolefin as a cavitating agent. These polymeric blends are referred to hereinafter as PLA/PO blends. A cavitating agent refers to a compound(s) capable of generating voids in the structure of film during the film-making process. Non-limiting examples of polyolefins suitable as cavitating agents in this disclosure include homopolymers and copolymers of polypropylene and polyethylene or blends of polypropylene and polyethylene. The polypropylene may be Ziegler-Natta or metallocene catalyzed. The polypropylene may be a homopolymer, a random copolymer of polypropylene or a heterophasic copolymer. In certain embodiments where the polypropylene is a copolymer, the comonomer may be ethylene. The polyethylene may be a high density polyethylene (HDPE), low density polyethylene (LDPE) or linear low density polyethylene (LLDPE).

When the cavitating agent is HDPE, the polyethylene may have an MI2 of less than 100 dg/min, or 0.1 to 5.0 dg/min, from 0.2 to 2.0 dg/min or from 0.4 to 0.7 dg/min or about 0.55 dg/min as measured by ASTM D-1238 at a temperature of 190° C. and a load of 2.16 kg. The density of the HDPE for these embodiments may be from 0.940 to 0.970 g/cc, 0.945 to 0.962 g/cc or about 0.946 g/cc as measured by ASTM D792. The peak molecular weight (Mp) of the HDPE may be greater than 10,000 g/mol, 40,000 g/mol, or greater than 50,000 g/mol as measured by GPC. The weight average molecular weight (Mw) of the HDPE may be between 20,000 and 200,000 or between 100,000 and 200,000 or between 130,000 and 170,000, as measured by GPC. In certain embodiments, the polydispersity (Mw/Mn) of the HDPE may be between 2 and 15. Examples of such HDPE suitable for use in this disclosure are HDPE 7194 manufactured by Total Petrochemicals.

In some embodiments, the PLA/PO blend may include between 50 and 99.5% PLA and 0.5% to 50% PO; or between 80% and 99.5% PLA and 0.5% to 20% PO; or between 90 and 95% PLA and 10% to 5% PO. All composition ratios are by weight of the components. In certain embodiments, the ratio of PLA to PO in the PLA/PO blend is between 1:1 and 199:1 or between 4:1 and 199:1, or between 9:1 and 19:1.

In certain embodiments of the present disclosure, the PLA/PO blend can contain between 0.2% and 30%, 0.5% to 20%, and 1%-5% compatibilizers, by weight as a percentage of the PLA/PO blend. In certain embodiments, the compatibilizer is maleic anhydride-modified polyolefins, styrene-ethylene/butylene-styrene (SEBS), an epoxy-modified polyolefin, or a combination thereof. In some embodiments, the only compatibilizer in the PLA/PO blend is a maleic anhydride-modified polyolefins, epoxy-modified polyolefin, SEBS or a combination thereof. Non-limiting examples of epoxy-modified polyolefins include, but are not limited to, epoxy-functionalized polypropylene, epoxy-functionalized polyethylene, epoxy-functionalized polybutadiene and combinations thereof.

An example of an epoxy-functionalized polyethylene suitable for use in this disclosure includes an ethylene-methacrylate copolymer, such as polyethylene co-glycidyl methacrylate (PE-co-GMA), such as LOTADER AX8840, which is a PE-co-GMA containing 8% GMA that is commercially available from Arkema. Another example of a compatibilizer suitable for use in this disclosure is POLYBOND 3200, which has 2.7% maleic anhydride commercially available from Chemtura. An example of an epoxy-functionalized polypropylene is glycidyl methacrylate grafted polypropylene (PP-g-GMA).

In certain embodiments when the compatibilizer is PP-g-GMA, the PP-g-GMA may be prepared by any suitable method such as for example by grafting GMA onto polypropylene in the presence of an initiator such as peroxide. Examples of initiators suitable for use in this disclosure include without limitation LUPERSOL 101 and TRIGANOX 301, which are peroxides commercially available from Arkema. In an embodiment, the initiator may be used in an amount of from 0.03% to 2 wt. % by total weight of the PLA/PO blend, alternatively from 0.2 wt. % to 0.8 wt. %, alternatively from 0.3 wt. % to 0.5 wt. %.

The grafting reaction of GMA onto PP may be conducted in a molten state inside an extruder such as, for example, a single extruder or a twin-screw extruder. Hereinafter, such process is referred to as reactive extrusion. A feedstock including PP, GMA, and initiator (i.e., peroxide) may be fed into an extruder reactor sequentially along the extruder, alternatively the feedstock (i.e., PP, GMA, and initiator) may be pre-mixed outside and fed into the extruder.

In an alternative embodiment, the PP-g-GMA is prepared by grafting GMA onto polypropylene in the presence of an initiator and a modifier. The modifier may be a multi-functional acrylate comonomer, styrene, divinylbenzene, and combinations thereof, for example. The multi-functional acrylate comonomers may be polyethylene glycol diacrylate, trimethylolpropane triacrylate (TMPTA), alkoxylated hexanediol diacrylatete, and combinations thereof, for example.

The multi-functional acrylate comonomer may be further characterized by a high flash point. The flash point of a material is the lowest temperature at which it can form an ignitable mixture in air, as determined in accordance with ASTM D93. The higher the flash point, the less flammable the material, which is a beneficial attribute for melt reactive extrusion. In an embodiment, the multi-functional acrylate comonomer may have a flash point of from 50° C. to 120° C., alternatively of from 70° C. to 100° C., alternatively of from 80° C. to 100° C. Examples of multi-functional acrylate comonomers suitable for use in this disclosure include without limitation SR256 (polyethylene glycol diacrylate), CD560 (alkoxylated hexanediol diacrylate), and SR351 (TMPTA), which are commercially available from Sartomer.

The grafting reaction of GMA onto polypropylene in the presence of a peroxide and the multi-functional acrylate comonomer polyethylene glycol diacrylate is depicted in Scheme 1

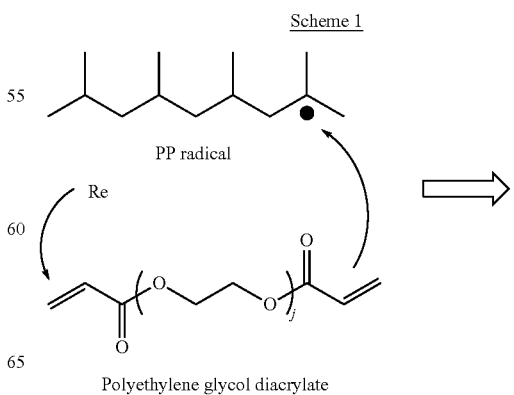

Polyethylene glycol diacrylate

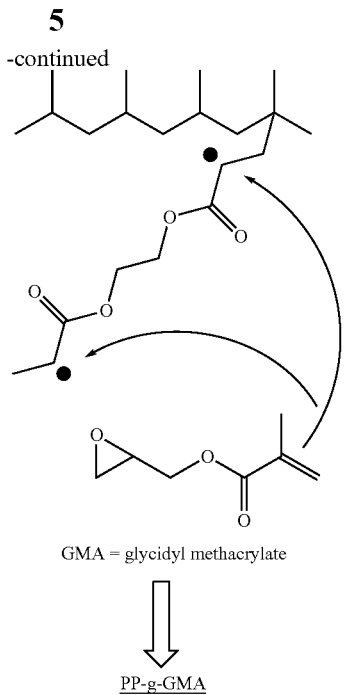

GMA = glycidyl methacrylate

PP-g-GMA

Without wishing to be limited by theory, the hydrogens on the tertiary carbon of polypropylene molecules can be easily abstracted in the presence of peroxide during reactive extrusion, forming polypropylene macroradicals with unpaired electrons. The polypropylene macroradicals which are generally unstable, tend to form free radicals through a step referred to as "β-scission." β-scission refers to a family of reactions wherein bonds that are in a beta-position to a radical are cleaved resulting in the formation of a double bond and a new radical. The β-scission reaction is believed to be responsible mainly for the formation of internal double bonds thus its occurrence is correlated with the allylic content of the final polymer. β-scission is typically favored over the grafting reaction (i.e. the addition of the GMA) resulting in both a lower grafting of GMA and a polypropylene having a lower average molecular weight. However, in the reactions including a multi-functional acrylate comonomer, the multi-functional acrylate comonomer may function to readily capture the polypropylene micro-radicals resulting in the formation of a more stable intermediate (i.e., polypropylene-acrylate radicals). The relatively stable propylene-acrylate radicals tend to react more readily with GMA, which is an acrylate type monomer, and consequently favor the grafting reaction.

In addition, as shown in Scheme 1, multiple free radicals may exist on the grafted propylene-acrylate molecules thus making it easier to capture and initiate the reaction of GMA. The reactivity of GMA towards acrylate free radicals may be higher than towards polypropylene tertiary macro-radicals. Consequently, PP-g-GMA prepared using a reaction mixture including a multi-functional acrylate comonomer may display a higher degree of grafting than a PP-g-GMA prepared using an otherwise similar composition in the absence of a multi-functional acrylate comonomer. PP-g-GMA prepared using a multifunctional acrylate comonomer is hereinafter referred to as a highly grafted GMA (HGGMA).

In an embodiment, the HGGMA is prepared from a reaction mixture including a polypropylene present in an amount of from 80 wt. % to 99.5 wt. %, alternatively from 90 wt. % to 99 wt. %, or alternatively from 95 wt. % to 99 wt. %; GMA present in an amount of from 0.5 wt. % to 20 wt. %, alternatively from 1.0 wt. % to 10 wt. %, or alternatively from 1.0 wt. % to 5.0 wt. %; a multi-functional acrylate comonomer present in an amount of from 0.5 wt. % to 15 wt. %, alternatively from 1.0 wt. % to 10 wt. %, or alternatively from 1.0 wt. % to 5.0 wt. %; and an initiator present in an amount of from 0.05 wt. % to 1.5 wt. %, alternatively from 0.2 wt. % to 0.8 wt. %, or alternatively from 0.3 wt. % to 0.5 wt. %. The ratio of GMA:multi-functional acrylate comonomer in the HGGMA may range from 1:5 to 10:1, alternatively from 1:2 to 5:1, or alternatively from 1:1 to 3:1.

The amount of grafting of GMA onto the polyolefin may vary depending on a variety of factors such as the type of materials used and processing conditions. Such parameters may be varied by one of ordinary skill in the art with the benefits of this disclosure to produce reactive modifiers having a user-desired grafting yield.

The grafting yield may be determined using any suitable method. For example, the grafting yield may be determined by Fourier Transform Infrared Spectroscopy (FTIR) spectroscopy. In an embodiment, a method for determining the grafting yield includes obtaining the FTIR spectra of polymeric samples having a mixture of PP and GMA wherein the amount of each component is known. A calibration curve may be generated by plotting the signal intensity at one or more wavelengths as a function of component concentration. The FTIR spectra of a PP-g-GMA sample may then be determined and compared to the calibration curve in order to determine the grafting yield. This method is described in more detail in Angew. Makromol. Chem, 1995, V229 pages 1-13 which is incorporated by reference herein in its entirety. In an embodiment, the HGGMA may have a grafting yield of from 0.2 wt. % to 15 wt. %, alternatively from 0.5 wt. % to 10 wt. %, or alternatively from 1.0 wt. % to 5.0 wt. %.

Other examples of compatibilizers are epoxy-modified polyolefins are made via reactive extrusion with the PLA/PO blend. As used herein, the term "reactive modifier" refers to polymeric additives that, when added to the molten PLA/PO blend, form compounds in situ that serve to stabilize the PLA/PO blend. The compounds formed in situ compatibilize the PLA/PO blend and the reactive modifiers are precursors to these compatibilizers.

In one or more embodiments, the reactive modifier is selected from oxazoline-grafted polyolefins, maleated polyolefin-based ionomers, isocyanate (NCO)-functionalized polyolefins and combinations thereof, for example. The oxazoline-grafted polyolefin is a polyolefin grafted with an oxazoline ring-containing monomer. In one or more embodiments, the oxazoline may include a 2-oxazoline, such as 2-vinyl-2-oxazoline (e.g., 2-isopropenyl-2-oxazoline), 2-fatty-alkyl-2-oxazoline (e.g., those obtainable from the ethanolamide of oleic acid, linoleic acid, palmitoleic acid, gadoleic acid, erucic acid and/or arachidonic acid) and combinations thereof, for example. In yet another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof, for example. The oxazoline-grafted polyolefin may include from about 0.1 wt. % to about 10 wt. % or from 0.2 wt. % to about 2 wt. % oxazoline, for example.

The isocyanate (NCO)-functionalized polyolefins may include a polyolefin grafted with an isocyanate functional monomer. The isocyanate may be selected from TMI® unsaturated isocyanate (meta), meta and para-isopropenyl-alpha, alpha-dimethylbenzyl isocyanate, meta-isopropenyl-alpha, alpha-dimethylbenzyl isocyanate, para-isopropenyl-alpha, alpha-dimethylbenzyl isocyanate and combinations thereof, for example.

The maleated polyolefin-based ionomers may include a polyolefin ionomer maleated and then neutralized with a metal component. Maleation is a type of grafting wherein maleic anhydride, acrylic acid derivatives or combinations thereof are grafted onto the backbone chain of a graftable polymer. The metal component may be selected from sodium hydroxide, calcium oxide, sodium carbonate, sodium hydrogencarbonate, sodium methoxide, sodium acetate, magnesium ethoxide, zinc acetate, diethylzine, aluminium butoxide, zirconium butoxide and combinations thereof, for example. In one specific embodiment, the metal component is selected from sodium hydroxide, zinc acetate and combinations thereof, for example.

In one or more embodiments, the graftable polymer is a polyolefin selected from polypropylene, polyethylene, combinations thereof and copolymers thereof.

In certain embodiments, the reactive modifiers may be formed by a grafting reaction. The grafting reaction may occur in a molten state inside of an extruder, for example (e.g., "reactive extrusion"). Such grafting reaction may occur by feeding a feedstock sequentially along the extruder or the feedstock may be pre-mixed and then fed into the extruder, for example.

In one or more embodiments, the reactive modifiers are formed by grafting in the presence of an initiator, such as peroxide. Examples of initiators may include LUPERSOL® 101 and TRIGANOX® 301, commercially available from Arkema, Inc., for example.

The initiator may be used in an amount of from about 0.01 wt. % to about 2 wt. % or from about 0.2 wt. % to about 0.8 wt. % or from about 0.3 wt. % to about 0.5 wt. % based on the total weight of the reactive modifier, for example.

Alternatively, the reactive modifiers may be formed by grafting in the presence of an initiator, such as those described above, and a modifier selected from multi-functional acrylate comonomers, styrene, divinylbenzene, triacrylate esters and combinations thereof, for example. The multi-functional acrylate comonomer may be selected from polyethylene glycol diacrylate, trimethylolpropane triacrylate (TMPTA), alkoxylated hexanediol diacrylatete, and combinations thereof, for example. The triacrylate esters may include trimethylopropane triacrylate esters, for example. It has unexpectedly been observed that the modifiers described herein are capable of improving grafting compared to processes absent such comonomers.

In one or more embodiments, the reactive modifier may include from about 80 wt. % to about 99.5 wt. %, or from about 90 wt. % to about 99 wt. % or from about 95 wt. % to about 99 wt. % polyolefin based on the total weight of the reactive modifier, for example.

In one or more embodiments, the reactive modifier may include from about 0.5 wt. % to about 20 wt. %, or from about 1 wt. % to about 10 wt. % or from about 1 wt. % to about 5 wt. % grafting component (i.e., the oxazoline, isocyanate, maleic anhydride, acrylic acid derivative) based on the total weight of the reactive modifier, for example.

In one or more embodiments, the reactive modifier may include from about 0.5 wt. % to about 15 wt. %, or from about 1 wt. % to about 10 wt. % or from about 1 wt. % to about 5 wt. % modifier based on the total weight of the reactive modifier, for example.

The ratio of grafting component to modifier may vary from about 1:5 to about 10:1, or from about 1:2 to about 5:1 or from about 1:1 to about 3:1, for example.

In one or more embodiments, the reactive modifier may exhibit a grafting yield of from about 0.2 wt. % to about 20 wt. %, or from about 0.5 wt. % to about 10 wt. % or from about 1 wt. % to about 5 wt. %, for example. The grafting yield may be determined by Fourier Transform Infrared Spectroscopy (FTIR) spectroscopy.

The PLA/PO blend may include from about 0.5 wt. % to about 20 wt. %, or from about 1 wt. % to about 10 wt. % or from about 3 wt. % to about 5 wt. % reactive modifier based on the total weight of the biodegradable polymeric composition, for example.

Examples of end use articles into which the PLA/PO blend may be formed include food packaging, office supplies, plastic lumber, replacement lumber, patio decking, structural supports, laminate flooring compositions, polymeric foam substrate; decorative surfaces (i.e., crown molding, etc.) weatherable outdoor materials, point-of-purchase signs and displays, house wares and consumer goods, building insulation, cosmetics packaging, outdoor replacement materials, lids and containers (i.e., for deli, fruit, candies and cookies), appliances, utensils, electronic parts, automotive parts, enclosures, protective head gear, reusable paintballs, toys (e.g., LEGO bricks), musical instruments, golf club heads, piping, business machines and telephone components, shower heads, door handles, faucet handles, wheel covers, automotive front grilles, and so forth. Additional end use articles would be apparent to those skilled in the art.

In an embodiment, the PP/PLA blends of this disclosure are used to prepare an injection molded article, including, without limitation, an injection blow molded article. In non-limiting examples, the injection blow molding process includes forming a pre-form and then biaxially stretching the pre-form.

In another embodiment, PLA/PO blends are used for the production of films, including non-oriented, uniaxially oriented, or biaxially oriented polylactic acid (BOPLA) films. As used herein, the term "biaxial orientation" refers to a process in which a polymeric composition is heated to a temperature at or above its glass-transition temperature but below its crystalline melting point. Immediately following heating, the material may then be extruded into a film, and stretched in both a longitudinal direction (i.e., the machine direction) and in a transverse or lateral direction (i.e., the tenter direction). Such stretching may be carried out simultaneously or sequentially.

In some embodiment, the PLA/PO blend is heated in an extruder. In certain of these embodiments, the PLA/PO blend may be mixed with an inorganic filler. The PLA/PO blend may be mixed with one or more inorganic fillers such as calcium carbonate, titanium dioxide, kaolin, alumina trihydrate, calcium sulfate, talc, mica, glass microspheres, or combinations thereof. The presence of such inorganic fillers may further increase the film opacity at a given film extrusion or stretching temperature over that of a film without such a filler, and may also extend the temperature window for forming opaque films. The inorganic fillers may be present in an amount of from 1 wt. % to 20 wt. %, alternatively from 1 wt. % to 15 wt. %, or alternatively from 1 wt. % to 10 wt. % of the total PLA/PO blend. In certain embodiments, the PLA/PO blend is not mixed with an inorganic filler.

The PLA/PO blend is heated in the extruder until molten. The molten polymer may then exit through a die and the molten plaque may be used to form an extruded film, a cast film, a biaxially oriented film, or the like. In an embodiment, the molten plaque may exit through the die and be taken up onto a roller without additional stretching to form an extruded film. Alternatively, the molten plaque may exit through the die and be uniaxially stretched while being taken up onto a chill roller where it is cooled to produce a cast film.

In an embodiment, the molten plaque exits through the die and is passed over a first roller (e.g., a chill roller) which solidifies the PLA/PO blend into a film. Then, the film may be biaxially oriented by stretching such film in a longitudinal direction and in a transverse direction. The longitudinal orientation may be accomplished through the use of two sequentially disposed rollers, the second (or fast roller) operating at a speed in relation to the slower roller corresponding to the desired orientation ratio. Longitudinal orientation may alternatively be accomplished through a series of rollers with increasing speeds, sometimes with additional intermediate rollers for temperature control and other functions.

After longitudinal orientation, the film may be cooled, pre-heated and passed into a lateral orientation section. The lateral orientation section may include, for example, a tenter frame mechanism, where the film is stressed in the transverse direction. Annealing and/or additional processing may follow such orientation. Alternatively, the film may be stretched in both directions at same time.

In some embodiments, the BOPLA film made from the PLA/PO blend is stretched in the longitudinal direction, the transverse direction or both at a temperature of equal to or less than 120° C., or from 65° C. to 120° C., or from 70° C. to 110° C., or from 70° C. to 90° C. In certain embodiments, the stretch speed in the making of the BOPLA film is up to 500 m/min, or up to 300 m/min of from 0.1 to 500 m/min in the longitudinal direction, the transverse direction or both.

Additional disclosure on biaxial film production may be found in U.S. Pat. No. 4,029,876 and U.S. Pat. No. 2,178,104, each of which is incorporated by reference herein in its entirety.

In certain embodiments of the disclosure, BOPLA films are opaque. "Opaque" refers to a film with greater than or equal to 80% haze, as measured by ASTM-D1003. In certain embodiments of the present disclosure, the BOPLA film has a haze of great than 80%, greater than 90%, greater than 95%, greater than 99% or about 100% as measured by ASTM-D1003. In certain embodiments of the present disclosure, the BOPLA film, when stretched biaxially at an oven temperature of above 80° C., has a haze of great than 80%, greater than 90%, greater than 95%, greater than 99% or about 100% as measured by ASTM-D1003. In certain embodiments of the present disclosure, the BOPLA film, when stretched biaxially at an oven temperature of from about 80° C. to about 90° C., has a haze of great than 80%, greater than 90%, greater than 95%, greater than 99% or about 100% as measured by ASTM-D1003. In some embodiments, the BOPLA films have a 45° gloss of less than 50%, less than 30%, less than 20% or less than 10% as measured by ASTM-D-2457.

In certain embodiments, the BOPLA films are single layer films. In other embodiments, the BOPLA films prepared from PLA/PO blends may form one or more layers of a multilayer film. The additional layers of the multilayer film may be any coextrudable film known in the art, such as syndiotactic polypropylene, low density polyethylene, linear low density polyethylene, medium density polyethylene, high density polyethylene, ethylene-propylene copolymers, butylenes-propylene copolymers, ethylene-butylene copolymers, ethylene-propylene-butylene terpolymers, ethylene-vinyl acetate copolymers, ethylene-vinyl alcohol copolymers, nylons, and the like, or combinations thereof.

EXAMPLE

The disclosure having been generally described, the following example shows particular embodiments of the disclosure. It is understood that the example is given by way of illustration and is not intended to limit the specification or the claims.

Figure 1B:
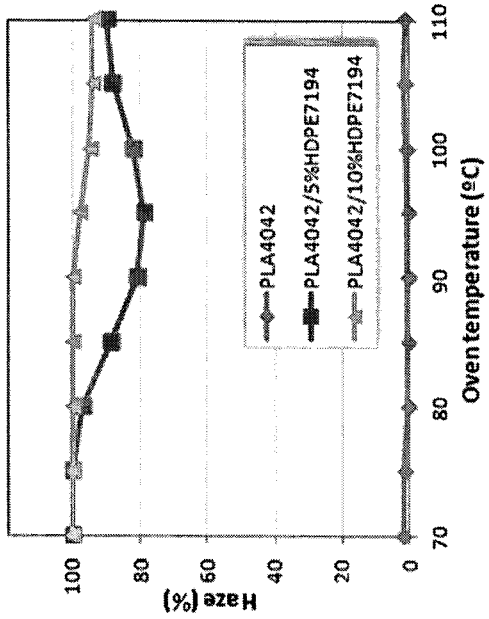
FIG. 1B is a graph of oven temperature versus gloss as described in the Example.

Samples of NatureWorks PLA4042 were blended with 5% and 10% Total Petrochemicals HDPE 7194 compounded and cast into 16 mil sheets. A "neat" sample, of NatureWorks PLA4042, i.e., without a polyolefin, was also cast into a 16 mil sheets. No inorganic fillers were used in any of the films. The neat PLA and PLA/HDPE blends were stretched biaxially at a 3×3 areal draw ratio within an oven temperature range from 70° C. to 110° C. at 5° C. temperature increments on a Bruckner Karo IV lab stretcher to form a white opaque film. The film samples were tested for haze and 45° gloss. Results for haze are shown below in TABLE 1. Results for gloss are shown below in TABLE 2. Results are graphically shown in FIGS. 1A and 1B, respectively. Haze was measured using ASTM-D1003. Gloss was measured using ASTM-D-2457.

TABLE 1

| Haze | PLA4042 | PLA4042/ 5%HDPE7194 | PLA4042/ 10%HDPE7194 |
| --- | --- | --- | --- |
| 70 | 1.7 | 100 | 100 |
| 75 | 1.5 | 100 | 100 |
| 80 | 0.5 | 97 | 100 |
| 85 | 0.6 | 89 | 100 |
| 90 | 0.6 | 81 | 100 |
| 95 | 0.6 | 79 | 98 |
| 100 | 1.1 | 82 | 95 |
| 105 | 1.4 | 88 | 94 |
| 110 | 1.3 | 90 | 94 |

TABLE 2

| Gloss | PLA4042 | PLA4042/ 5%HDPE7194 | PLA4042/ 10%HDPE7194 |
| --- | --- | --- | --- |
| 70 | 78 | 25 | 17 |
| 75 | 78 | 20 | 15 |
| 80 | 82 | 24 | 17 |
| 85 | 82 | 19 | 18 |
| 90 | 80 | 19 | 16 |
| 95 | 81 | 13 | 12 |
| 100 | 81 | 10 | 5 |
| 105 | 78 | 7 | 5 |
| 110 | 73 | 5 | 5 |

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

What is claimed is:

1. A biaxially oriented film comprising:
    a PLA and polyolefin (PLA/PO) blend, the film having a haze of 80% or greater as measured by ASTM-D1003 and a 45° gloss of less than 50% as measured by ASTM-D-2457;

wherein the polyolefin is a polyethylene, and wherein the PLA/PO blend includes between 80 and 99.5 weight percent of the PLA.

2. The film of claim 1, wherein the polyethylene is HDPE, LDPE, LLDPE or a combination thereof.

3. The film of claim 2, wherein the HDPE has a density of from 0.945 to 0.962 g/cc as measured by ASTM D792.

4. The film of claim 1, wherein the ratio of the PLA to the PO in the blend is between 4:1 and 199:1.

5. The film of claim 4, wherein ratio of the PLA to the PO in the blend is between 9:1 and 19:1.

6. The film of claim 1, wherein the PLA/PO blend further comprises a compatibilizer, wherein the compatibilizer content in the PLA/PO blend is between 1% and 5% by weight of the PLA/PO blend.

7. The film of claim 6, wherein the compatibilizer is maleic anhydride-modified polyolefin, styrene-ethylene/butylene-styrene (SEBS), an epoxy-modified polyolefin, or a combination thereof.

8. The film of claim 7, wherein the compatibilizer is an epoxy-functionalized polypropylene, an epoxy-functionalized polyethylene, an epoxy-functionalized polybutadiene, or a combination thereof.

9. The film of claim 1, wherein the PLA/PO blend further comprises a reactive modifier.

10. The film of claim 9, wherein the reactive modifier is an oxazoline-grafted polyolefin, a maleated polyolefin-based ionomer, an isocyanate (NCO)-functionalized polyolefin, or combinations thereof.

11. The film of claim 1, wherein the haze is greater than 95%.

12. The film of claim 11, wherein the 45° gloss is less than 20%.

13. The film of claim 1, wherein the film has a haze that is greater than 99%.

14. The film of claim 1, wherein the film has a haze that is about 100%.

15. The film of claim 1, wherein the film has a 45° gloss that is less than 10%.

16. The film of claim 1, wherein the polyethylene is HDPE having an $MI_2$ of from 0.1 to 5.0 dg/min, as measured by ASTM D-1238 at a temperature of 190° C. and a load of 2.16 kg.

17. The film of claim 1, wherein the polyethylene is HDPE having a peak molecular weight (Mp) of greater than 10,000 g/mol, as measured by GPC.

18. The film of claim 1, wherein the polyethylene is HDPE having a weight average molecular weight (Mw) of between 20,000 and 200,000 g/mol, as measured by GPC.

19. The film of claim 1, wherein the polyethylene is HDPE having a polydispersity (Mw/Mn) of between 2 and 15.

20. The film of claim 1, wherein the polyethylene is HDPE having a density of from 0.940 to 0.970 g/cc as measured by ASTM D792.

21. The film of claim 1, wherein the PLA is a stereocomplex polylactic acid or surface-modified polylactic acid.

22. The film of claim 1, wherein the PLA/PO blend includes between 90 and 95 weight percent of the PLA.

23. The film of claim 1, wherein the film is stretched biaxially at an oven temperature of above 80° C. and has a haze of greater than 90%, as measured by ASTM-D1003.

24. The film of claim 1, wherein the film is a single layer film.

25. The film of claim 1, wherein the film is a multilayer film having one or more layers formed of the PLA/PO blend and an additional layer comprising syndiotactic polypropylene, low density polyethylene, linear low density polyethylene, medium density polyethylene, high density polyethylene, ethylene-propylene copolymers, butylenes-propylene copolymers, ethylene-butylene copolymers, ethylene-propylene-butylene terpolymers, ethylene-vinyl acetate copolymers, ethylene-vinyl alcohol copolymers, nylons, or combinations thereof.

* * * * *